United States Patent [19]

Roy et al.

[11] Patent Number: 5,435,843
[45] Date of Patent: Jul. 25, 1995

[54] ALKALI ACTIVATED CLASS C FLY ASH CEMENT

[75] Inventors: Amitava Roy; Paul J. Schilling; Harvill C. Eaton, all of Baton Rouge, La.

[73] Assignee: Board of Supervisors of Louisiana State University and Agricultural and Mechanical College, Baton Rouge, La.

[21] Appl. No.: 119,475

[22] Filed: Sep. 10, 1993

[51] Int. Cl.[6] ........................ C04B 7/12; C04B 7/36
[52] U.S. Cl. ................................. 106/705; 106/789; 106/708; 106/DIG. 1; 264/DIG. 49
[58] Field of Search .......... 106/697, 705, 789, DIG. 1, 106/708; 264/DIG. 49; 501/155

[56] References Cited

U.S. PATENT DOCUMENTS

| | | | |
|---|---|---|---|
| 3,854,968 | 12/1974 | Minnick et al. | 106/109 |
| 4,050,950 | 9/1977 | Brewer et al. | 106/DIG. 1 |
| 4,226,630 | 10/1980 | Styron | 106/DIG. 1 |
| 4,313,763 | 2/1982 | Turpin, Jr. | 106/DIG. 1 |
| 4,353,749 | 10/1982 | Ray et al. | 106/DIG. 1 |
| 4,374,672 | 2/1983 | Funston | 106/DIG. 1 |
| 4,375,986 | 3/1983 | Pichat | 106/DIG. 1 |
| 4,642,137 | 2/1987 | Heitzman et al. | 106/DIG. 1 |
| 4,715,896 | 12/1987 | Berry | 106/DIG. 1 |
| 4,761,182 | 8/1988 | Whitescarver et al. | 106/DIG. 1 |
| 4,997,484 | 3/1991 | Gravitt et al. | 106/705 |
| 5,073,198 | 12/1991 | Kurz | 106/789 |

OTHER PUBLICATIONS

Kosmatka et al. "Design and Control of Concrete Admixtures", Thirteenth Edition, PCA, 1988 pp. 68–69 (no month).
E. Rau, "The P-O-Tec Process for Fixation of Industrial Waste," Proc. VIIth Int. Cong. Chem. Cem., Paris, pp. 657–662 (1980) (no month).
P. Schilling, "The Structure of Cementitious Materials Produced by Alkali Activation of Calcium Aluminosilicate Glasses," PhD Dissertation, Louisiana State University (defended 1992; catalogued and shelved 1993) (no month).
W. H. Buttermore, "The Use of Pulverized Coal Flyash and Limestone Fluid Bed Combustor Ash in the Production of Lightweight Cellular Concrete," in M. D. LaGrega et al. (eds.), *Toxic and Hazardous Wastes, Proc. 16th Mid-Atlantic Indst. Waste Conf.*, pp. 230–240 (1984) (no month).
V. D. Glukhovsky et al., "High-strength Slag-Alkaline Cements," Proc. VIIth Int. Cong. Chem. Cem., V, pp. 164–168 (1980) (no month).
M. Kawamura et al., "Reaction Process and Microstructure in Compacted Fly Ashes and Fly Ash-Chemical Additive Mixtures," Proc. VIIIth Int. Cong. Chem. Cem., Rio de Janeiro, 3.1, 92–97 (1986) (no month).
A. L. A. Fraay et al., "The Reaction of Fly ash in Concrete. A Critical Examination," Cem. Concr. Res., vol. 19, pp. 235–246 (1989) (no month).
A. Roy et al., "Solidification/Stabilization of Hazardous Wastes: Evidence of Physical Encapsulation," Environ. Sci. & Technol., vol. 26, pp. 1349–1353 (1992) (no month).

(List continued on next page.)

*Primary Examiner*—Mark L. Bell
*Assistant Examiner*—Michael Marcheschi
*Attorney, Agent, or Firm*—John H. Runnels

[57] ABSTRACT

Class C fly ash may be activated with strong alkali to yield a novel, dense, quick-setting cement having unexpected properties. The setting time of the cement decreased as the pH of the activating solution increased. The microstructure and phase assemblage of the novel cement depended on the pH. Ettringite was absent beyond pH 14.30 (2.0N); a hexagonal plate-like crystalline form (strätlingite (gehlenite hydrate, $C_2ASH_8$) and other compounds) became more abundant at higher pH. At higher pH the microstructure was characterized by high amounts of the plate-like crystalline phase and a dense matrix, due to higher reactivity of the glassy phase in fly ash. The novel cement will have uses in a number of areas, including fixation of hazardous wastes such as radioactive wastes, applications where rapid setting is desired, and formation of concrete in hot environments where ordinary Portland cements may tend to crack due to their heat of hydration.

9 Claims, No Drawings

OTHER PUBLICATIONS

A. Roy et al., "Activation of Ground Blast-Furnace Slag by Alkali-Metal and Alkaline-Earth Hydroxides," J. Am. Ceram. Soc., vol. 75, No. 12, pp. 3233–3240 (1992) (no month).

A. Roy et al., "Alkali Activation of Class C Fly Ash," Proc. ASCE Natl. Conv. New York (Sep. 13–17, 1992).

S. J. Way et al., "Early Hydration of a Portland Cement in Water and Sodium Hydroxide Solutions: Composition of Solutions and Nature of Solid Phases," Cement and Concrete Res., vol. 19, pp. 759–769 (1989) (no month).

R. Helmuth, Fly Ash in Cement and Concrete, Portland Cem. Assoc., pp. 1–17 (1987) (no month).

ALKALI ACTIVATED CLASS C FLY ASH CEMENT

This invention pertains to inorganic cements, particularly to a novel type of cement prepared from Class C fly ash.

Ordinary Portland cement is the most commonly used construction cement today. Ordinary Portland cement is a mixture primarily of calcium silicate and calcium aluminate minerals which react with water to form a dense, solid paste. The reaction products of ordinary Portland cement are calcium hydroxide, ettringite, and a poorly-crystalline phase called calcium-silicate-hydrate. Although ordinary Portland cement is suitable for a variety of uses, its performance is less than ideal in some applications. For example, sulfate-rich seawater or groundwater may result in the breakdown of a nearby ordinary Portland cement concrete structure. The setting time of ordinary Portland cement can be too slow where rapid repairs are needed, such as airport runways or pavements. Corrosion of embedded steel structures can occur when the pH drops below a certain level. The permeability is rather high, reducing durability, particularly in climates where freezing and thawing occur frequently. Portland cement has a high heat of hydration, making it unsuitable for use in some environments. For example, the high heat of hydration can cause cracking or buckling when ordinary Portland cement is used in hot climates.

Fly ash is a by-product of burning coal, typically generated during the production of electricity at coal-fired power plants. Fly ashes contain variable amounts of different components: typically high amounts of glass, as well as mineral phases which had been present as impurities in the original coal, or which may have been produced during cooling of the molten material. Fly ash typically contains on the order of 85% glassy, amorphous components. ASTM C 618-85 ("Standard Specification for Fly Ash and Raw Calcined Natural Pozzolan for Use as a Mineral Admixture in Portland Cement Concrete, pp 385–388 (1985)) has classified fly ash into two classes, Class C and Class F, depending on the total sum of silica, alumina and ferric oxide present. Class F contains more than 70% of the above oxides, and Class C contains less than 70% but more than 50%. Class C fly ash typically is high in calcium, and is normally produced as a by-product of the combustion of lignite or sub-bituminous coal.

Many potential uses for fly ash have been identified, but to date there has been little large-scale use of fly ash in the United States. Fly ash has been used as a partial substitute in ordinary Portland cement (typically at a pH around 12), in the production of cellular concrete, and as a binder in waste disposal (e.g., Rau, 1980). See R. Helmuth, Fly Ash in Cement and Concrete, Portland Cem. Assoc., pp. 1–17 (1987); W. H. Buttermore, "The Use of Pulverized Coal Flyash and Limestone Fluid Bed Combustor Ash in the Production of Lightweight Cellular Concrete," in M. D. LaGrega et al. (eds.), *Toxic and Hazardous Wastes, Proc. 16th Mid-Atlantic Indst. Waste Conf.*, pp. 230–240 (1984); and E. Rau, "The Poz-O-Tec Process for Fixation of Industrial Waste," Proc. VII$^{th}$ Int. Cong. Chem. Cem., Paris, pp. 657–662 (1980).

Although the main use of fly ash to date has been as a partial substitute in Portland cement, Class C fly ash itself has cementitious properties. Class C fly ash is hydraulic, and when mixed with lime can be used as a cement. A principal hydration product in lime-fly ash mixtures is ettringite, but the resulting solid has a porous microstructure, which can cause deleterious properties. M. Kawamura et al., "Reaction Process and Microstructure in Compacted Fly Ashes and Fly Ash-Chemical Additive Mixtures," Proco VIII$^{th}$ Int. Cong. Chem. Cem., Rio de Janeiro, 3.1, 92–97 (1986).

Granulated blast furnace slag (BFS), a highly impure, calcium alumino-silicate glass, is a by-product of pig-iron production. BFS can be reacted with a high pH solution to rapidly form an amorphous solid mass having high strength (a process called alkali activation). The high pH solution could contain hydroxides of alkali metals or alkaline earths, water, glass, etc. See V. D. Glukhovsky et al., "High-strength Slag-Alkaline Cements," Proc. VII$^{th}$ Int. Cong. Chem. Cem., V, pp. 164–168 (1980). Activated BFS even performs better than hydrated Portland cement in some respects, and has been used as a construction material, particularly in Eastern Europe. Blast furnace slag has some similarities to Class C fly ash. Both are calcium alumino-silicate glasses. However, there are also significant differences. The amount of crystalline material is much higher in Class C fly ash. Fly ash usually occurs as spherical particles, while slag is typically found as broken particles. Fly ash has a lesser glass content. Because blast furnace slag is more glassy while fly ash is more crystalline, the reactions of the two would not be expected to be similar.

A. Roy et al., "Activation of Ground Blast-Furnace Slag by Alkali-Metal and Alkaline-Earth Hydroxides," J. Am. Ceram. Soc., vol. 75, no. 12, pp. 3233–3240 (1992) (not admitted to be prior art) discusses the significance of pH on alkali activated blast furnace slag. See also P. Schilling, "The Structure of Cementitious Materials Produced by Alkali Activation of Calcium Aluminosilicate Glasses," PhD Dissertation, Louisiana State University (defended 1992; catalogued and shelved 1993; not admitted to be prior art).

S. J. Way et al., "Early Hydration of a Portland Cement in Water and Sodium Hydroxide Solutions: Composition of Solutions and Nature of Solid Phases," Cement and Concrete Res., vol. 19, pp. 759–769 (1989) noted that when the pH of the water mixed with Portland cement was increased to 14.30 (2.0N), ettringite was absent. A. L. A. Fraay et al., "The Reaction of Fly ash in Concrete. A Critical Examination," Cem. Concr. Res., vol. 19, pp. 235–246 (1989) showed that when the pH of the pore solution increased, the solubility of gypsum present in fly ash decreased. In ordinary Portland cement, the presence of gypsum tends to retard the set time; but it also reacts to form ettringite, a needle-like crystal which can yield undesirable properties.

U.S. Pat. No. 4,997,484 discloses a cement comprising Class C fly ash; 0.4–4.2% of an alkali metal activator, preferably potassium hydroxide; and 0.6–5% citric acid. Citric acid, of course, is relatively expensive. There is no express mention of pH.

U.S. Pat. No. 4,715,896 discloses a consolidated fill suitable for non-structural purposes comprising 55–97% blast furnace slag, most preferably 85–95%; 3–45% Class C fly ash, most preferably 5–15%; and an alkali activator having a pH of at least about 11, most preferably above about 13.

U.S. Pat. No. 3,854,968 discloses a cement comprising fly ash and a lime-sulfate material.

In prior types of cement produced from Class C fly ash, strätlingite has seldom been mentioned, and when it has been mentioned it has usually been thought of as only a minor component.

The prior art has attached little significance to the pH of the incipient cement mixture. It has been discovered that unexpected properties can be obtained with a novel cement made by reacting Class C fly ash with an aqueous solution having a high pH—greater than 14.3 (2.0 Normal for a strong base), preferably greater than 14.69 (5.0 Normal for a strong base). The cement reaction product has a number of advantageous properties not typical of ordinary Portland cement, or of ordinary Portland cement/fly ash mixtures. The novel cement is essentially free of ettringite and citric acid, and has a microstructure denser than that of either ordinary Portland cement or hardened pastes made from ordinary Portland cement/fly ash mixtures, making the novel cement strong and impervious to penetrating or leaching solutions. The cement can be used as a structural cement. The cement sets rapidly at ambient temperature, which has advantages in a number of applications. Where rapid setting is not desired, retarding agents can be used to slow the setting time. The reaction has a low heat of hydration, allowing the cement to be used advantageously in certain hot environments where ordinary Portland cement can crack or buckle due to its high heat of hydration.

The novel cement is particularly advantageous for binding hazardous waste materials, facilitating their safe disposal or storage.

The novel cement is expected to be resistant to sulfate attack. The invention makes advantageous use of fly ash, which has previously been viewed as an undesired waste by-product. The reaction product may also contain some unreacted fly ash, which can be advantageous because the unreacted fly ash can help to fill voids in the cement microstructure.

Class C fly ash from the Gifford-Hill power plant in Cason, Tex. was used in all experiments. Activator solutions of hydroxides of Li, Na, and K having pH 12.30 (0.02N), 13.69 (0.5N), 14.30 (2.0N) and 14.69 (5.0N) were prepared. A water/ash ratio of 0.4 was used in all cases. After mixing, the samples were stored at ambient temperature in sealed plastic bags for the periods of 7, 14, or 28 days.

The fly ash samples hardened rapidly after mixing with the alkali solutions. The set time was observed to decrease as the pH of the activating solution increased, and at the highest pH final set occurred within minutes of mixing. Even at the lower pH (e.g., around 14.3), initial set occurred within minutes (usually less than about five minutes), and final set within about an hour. By comparison, ordinary Portland cement sets an order of magnitude more slowly, typically requiring hours for the initial set, while the final set typically does not occur for from seven to ten hours. Fly ash specimens activated at lower pH ($\leq 0.5N$) turned into moist pastes when they were ground for x-ray diffractometry or thermal analysis. By contrast, the specimens activated at higher pH, particularly 14.69 (5.0N), were quite dry when crushed.

The samples were analyzed by scanning electron microscopy, energy dispersive x-ray microanalysis, x-ray diffractometry and thermal methods. The details of the experimental procedures, except for the thermal methods, are the same as those found in A. Roy et al., "Solidification/Stabilization of Hazardous Wastes: Evidence of Physical Encapsulation," Environ. Sci. & Technol., vol. 26, pp. 1349–1353 (1992) (not admitted to be prior art).

Simultaneous differential thermal analysis, thermogravimetry, and derivative thermogravimetry were performed on most samples. Thermal analysis was performed with a Seiko TG/DTA 220 analyzer. Samples were loaded in platinum crucibles. Calcined alumina was used as a reference standard. Each analysis was performed in three steps: i) heated from 25° C. to 40° C. at the rate of 5° C./min, held at 40° C. for ten minutes; ii) heated from 40° to 200° C. at the rate of 5° C./min; and iii) heated from 200° to 1000° C. at the rate of 10° C./min. Analysis was carried out in a nitrogen atmosphere with a flow rate of 100 mL/min.

Scanning Electron Microscopy

At low magnifications (100–1000 X), samples activated at the lowest pH (12.3; 0.02N) had a microstructure which was similar in porosity to that of ordinary Portland cement, a microstructure comprising loosely-packed fly ash spheres of various sizes, with randomly oriented ettringite needles crystallizing into the pores. A few plate-like crystals of unknown composition were seen. The ettringite needles were up to 15 $\mu$m long. Ettringite was still observed when the pH of the activating solution was 13.69 (0.5N), but it was absent when the pH was 14.30 (2.0N). As pH increased, fewer pores were observed, and the fraction of plate-like crystals increased, resulting in a denser microstructure. The thin plates were a few micrometers wide and a few tenths of a micrometer in thickness, and sometimes (though rarely) hexagonal faces were seen. The crystals had variable size but were as much as 5 $\mu$m in diameter. These plates grew at random, creating a honeycomb pattern. With increasing pH they coalesced to produce a denser structure, or grew as radiating crystals. In older samples (i.e., those with longer cure times) activated at high pH, these plates appeared to grow in parallel stacks, resulting in fewer large pores. A new morphology appeared in older samples activated at higher pH—a morphology which was more equant (i.e., equi-dimensional), and which had partially developed crystalline faces. (The crystal system could not be determined.) Another morphology was observed in samples activated at pH $\geq 2.0N$, comprising spherical structures less than one $\mu$m in diameter. Individual fly ash spheres showed varying degrees of reaction. Some had a smooth surfaced while others were covered by a very fine-grained reaction product, about 0.15 $\mu$m in diameter. In some cases coarser platelets grew out of the fly ash spheres. On average, more fly ash spheres reacted at higher pH. At higher pH often nothing was left of a fly ash sphere except its outline. See generally FIGS. 1(a)–(d) of A. Roy et al., "Alkali Activation of Class C Fly Ash," Proc. ASCE Natl. Conv. New York, pp. 104–15 (Sep. 13–17, 1992), the entire disclosure of which is incorporated by reference (and which is not prior art to this invention).

Energy Dispersion X-Ray Analysis (EDX)

The thin plates from a wide variety of samples were analyzed by energy dispersive x-ray analysis. The plates were found to be alumino-silicate in composition, but the amounts of Ca, Na, and K varied widely, depending primarily on the activator composition. Spatial variation in chemical composition was absent within these crystals. Analyses of some fly ash spheres also showed a variable composition. Some analyses indicated severe depletion of calcium. See generally FIGS. 2(a)-(f) of Roy et al. (1992).

X-Ray Diffractometry

Quartz, periclase, magnetite, ferrite spinel, anhydrite, lime, and melilite were identified in the unreacted fly ash through x-ray diffractometry. Most of the inert phases (for example, quartz and periclase) persisted in the activated samples.

At all pH's, C—S—H was the principal reaction product. However, C—S—H was not observed by X-ray diffractometry because it is not crystalline. Ettringite was the principal crystalline reaction product at the lowest pH (12.30; 0.02N), irrespective of age. Ettringite peaks were still present when the activation pH increased to 13.69 (0.5N), but were absent when the pH was further increased to 14.30 (2.0N). Some other minor phases were identified, but for these phases the matches between the peaks present in the patterns and the peaks listed in the Joint Committee for Powder Diffraction Standards ("JCPDS") files (JCPDS, 1987) were moderate at best. For example, the 1.2 nm peak of strätlingite was often absent in the patterns, but with 0.627 and 0.418 nm peaks present. Strätlingite was identified (PDF #0,29,285) at low pH and young age in all samples, a match which improved with both pH and age. Lime was identified in some samples when the pH was $\geq$2.0N, particularly in the LiOH- and NaOH-activated samples. Monosulfate was identified in some samples with high pH, for example, in the sample of fly ash activated by 14.30 pH KOH solution and cured for 7 days.

TABLE I

| Symbols Used for Phases in XRD Patterns | |
|---|---|
| C = | Lime (CaO)# |
| Et = | Ettringite ($3CaO.Al_2O_3.3CaSO_4.Al_2O_3.32H_2O$) |
| HG = | Hydrogarnet ($C_3AH_6$) |
| Mr = | Merwinite ($C_3MS_3$) |
| Pe = | Periclase (MgO) |
| Qu = | Quartz ($SiO_2$) |
| St = | Strätlingite (Gehlenite hydrate, $C_2ASH_8$) |

— Cement chemist's notation: A = $Al_2O_3$; C = CaO; H = $H_2O$; MgO = M; $SiO_2$ = S.

In the XRD patterns of fly ash samples of the same age activated by 14.30 pH (2.0N) solutions of three activators, the peaks at low 28 did not match each other. See generally FIG. 3 of Roy et al. (1992). Hydrogarnet ($C_3AH_6$, PDF #24,217) was identified in the LiOH- and NaOH-activated samples, but was absent from the KOH-activated sample.

Thermal Analysis

Thermogravimetry (TG)

For samples of the same age, the slopes of thermogravimetric curves increased with pH, particularly in the lower half of the temperature range, See generally FIG. 4 of Roy et al. (1992). When time was the only variable, the increase in slope was minor.

Derivative Thermogravimetry (DTG)

Derivative thermogravimetry measurements were taken of various samples. See Table II below, and see generally FIG. 5 of Roy et al. (1992). A few of the observed peaks could not be identified. The amounts of identified phases were calculated, based on mass lost ($H_2O$ or $CO_2$) and assuming ideal formulation $3CaSO_4.CaO.Al_2O_3. 32H_2O$ for ettringite and $C_2ASH_8$ for strätlingite). This assumption is an approximation, as the EDX analyses suggest that the chemical compositions of these phases were in fact more complex.

TABLE II

Derivative Thermogravimetry and Thermogravimetry of Fly Ash Samples

| pH | Age (days) | Unknown Phase °C. | Ettringite °C. (%) | Unknown Phase °C. | $C_2ASH_8$ °C. (%) | Unknown Phase °C. | Unknown Phase °C. | $CaCO_3$ °C. (%) |
|---|---|---|---|---|---|---|---|---|
| Fly Ash | | | | | | | | |
| | | | | | | 403 | | 596 (0.30) |
| Fly Ash + LiOH | | | | | | | | |
| 12.30 | 7 | | 77 (7.38) | | 253 (2.41) | | | |
| 12.30 | 14 | | 81 (7.93) | | 236 (2.78) | | | 614 (0.39) |
| 12.30 | 28 | | 82 (7.80) | | 250 (3.16) | | | 618 (0.32) |
| 13.69 | 7 | | 64 (4.40) | | 236 (2.03) | | | 605 |
| 13.69 | 14 | | 64 (4.40) | | 238 (2.20) | | | |
| 13.69 | 28 | | 68 (4.92) | | 238 (2.67) | | | 605 (0.57) |
| 14.30 | 14 | 51 | | | 232 (5.02) | | 546 | |
| 14.30 | 28 | 51 | | | 243 (5.10) | | 538 | |
| 14.69 | 14 | 55 | | | 250 (5.05) | 400 | | |
| 14.69 | 28 | 64 | | 133 | 227 (5.36) | 365 | 536 | |
| Fly Ash + NaOH | | | | | | | | |
| 12.30 | 7 | | 79 (7.62) | | 253 (2.32) | | | |
| 12.30 | 14 | | 83 (8.02) | | 253 (2.46) | | | |
| 12.30 | 28 | | 72 (8.47) | | 244 (3.10) | | | 614 |
| 13.69 | 7 | | 62 (3.59) | | 243 (2.46) | | | |
| 13.69 | 14 | | 70 (4.00) | 111 | 236 (1.74) | | | |
| 13.69 | 28 | | 64 (4.18) | 128 | 244 (2.73) | | | |
| 14.30 | 14 | 50 | | 110 | 250 (2.44) | 400 | | |
| 14.30 | 28 | | | 115 | 244 (9.40) | 398 | | 579 |
| 14.69 | 14 | 60 | | 140 | 224 (12.57) | 394 | 547 | |
| 14.69 | 28 | 55 | | | 270 (13.80) | | | |
| Fly Ash + KOH | | | | | | | | |
| 12.30 | 7 | | 77 (7.67) | | 236 | | | |
| 12.30 | 14 | | 64 (8.80) | | 253 | | | 656 (1.77) |
| 12.30 | 28 | | 75 (8.13) | | 233 | | | 625 (2.43) |
| 13.69 | 7 | | 80 (1.84) | 143 | 246 (2.20) | | | 616 (0.41) |
| 13.69 | 14 | | 68 (4.14) | 137 | 235 (1.77) | | | 605 (0.36) |
| 13.69 | 28 | | 68 (4.85) | 135 | 227 (2.61) | | | 613 (0.41) |

TABLE II-continued

| | | Derivative Thermogravimetry and Thermogravimetry of Fly Ash Samples | | | | | | |
|---|---|---|---|---|---|---|---|---|
| pH | Age (days) | Unknown Phase °C. | Ettringite °C. (%) | Unknown Phase °C. | $C_2ASH_8$ °C. (%) | Unknown Phase °C. | Unknown Phase °C. | $CaCO_3$ °C. (%) |
| 14.30 | 14 | | | 110 | 232 (2.32) | 407 | | |
| 14.30 | 28 | | 51 | 115 | 244 (4.76) | | | |
| 14.69 | 14 | | | 95 | 267 (13.05) | | | |
| 14.69 | 28 | | 55 | 102 | 270 (13.05) | | | |

The DTG peaks were identified as follows:

50°–64° C.: This peak was not assigned to any phase. It appeared when ettringite was present in low amounts. This peak correlated positively with the 95°–141° C. peak (gypsum) and negatively with the 62°–83° C. (ettringite) peak, suggesting some reaction relationship between these phases.

62°–83° C.: A comparison of the SEM images, XRD peaks, available literature data, and DTG curves of activated and unhydrated fly ash suggested that this peak is due to ettringite. The peak usually shifted to lower temperatures when the amount of ettringite was low.

95°–141° C.: The peak for reagent grade gypsum occurred at 115° C. Gypsum peaks were observed in the XRD patterns of some samples when ettringite was absent, but erratically. Based on the above argument, this peak was assigned to gypsum.

227°–253° C.: This peak was assigned to strätlingite (following the argument used to assign the 62°–83° C. peak to ettringite). This peak was present in all samples. Its intensity increased strongly with pH, and less strongly with time.

365°–407° C.: This peak was present in samples activated at pH $\geq$ 14.30, particularly the NaOH- and LiOH-activated samples. The literature has reported a dehydration peak for hydrogarnet ($C_3AH_6$) in calcium alumino-silicate glasses at around 375° C. Some peaks for this phase were present in some XRD patterns (e.g., 14.30 pH LiOH-activated, 14 days). A crystalline form having equant dimensions was observed in the SEM in samples activated at high pH.

538°–547° C.: This peak could not identified.

596°–656° C.: This peak was assigned to calcium carbonate. The peak for reagent grade calcium carbonate occurred at 635° C.

Alkali-activated Class C fly ash cement should be considerably less expensive than cements formed, for example, from activated slag. Class C fly ash is more widely available in large quantities, and it requires no pre-processing (e.g., quenching and grinding). Alkali hydroxides could be relatively expensive, but in many cases it should be possible to use waste alkali hydroxides, which at present do not find any use. Even hazardous wastes containing a large fraction of suitable hydroxides should be effective, providing one means for the efficient use of the novel cements in hazardous waste remediation. An alkali-activated Class C fly ash cement, because of its dense microstructure, will have numerous applications.

In summary, we observed that activation of fly ash by high pH solutions inhibited or delayed ettringite crystallization, and produced more of the hexagonal plate-like phase, which was believed to be largely strätlingite, with some other compounds as well. A pH of at least 14.3 (2.0 Normal) is preferred to inhibit ettringite crystallization and to obtain a dense microstructure; a pH of at least 14.69 (5.0 Normal) is most preferred.

At lower pH, activated fly ash had a microstructure which comprising loosely-packed fly ash spheres with ettringite needles in between. With increasing pH, fewer glassy spheres were seen, and the hexagonal plates formed a denser microstructure due to the coalescing plates, in contrast with a more open honey-comb structure at lower pH. Many problems in cement durability are related to porosity and permeability. The present invention allows modification of those properties in an advantageous way by increasing the pH of the activating solution.

The XRD patterns indicated the presence of other compounds, in addition to strätlingite, at higher pH. Multiple DTG peaks also indicated that several different compounds were present. Along with the XRD and DTG evidence, the wide variability in chemical composition of the hexagonal plates indicated that several different compounds having hexagonal symmetry were probably present.

The XRD and DTG data suggest that selective crystallization can be effected during alkali activation. At pH 14.69 (5.0N) large amounts of strätlingite crystallized when NaOH or KOH was used as the activator, compared to LiOH. By contrast, in prior types of cement, strätlingite has seldom been mentioned, and when it has been mentioned it has usually been thought of as only a minor component. The selective crystallization of strätlingite in fly ash cements in accordance with the present invention could be beneficial; for example, incorporating K and/or Na may increase resistance of the cement to alkali aggregate attack.

A comparison of scanning electron microscopy of activated BFS with activated Class C fly ash showed that at pH 14.69 (5.0N) the fraction of crystalline phases in activated fly ash was considerably higher than that for activated BFS. Unhydrated Class C fly ash contains several crystalline phases, while BFS is mostly amorphous. It is believed, without wishing to be bound by this theory, that the crystals in the Class C fly ash may act as seed crystals during alkali activation.

One application of the present invention is in stabilization of certain hazardous wastes. An alkali-activated Class C fly ash cement in accordance with the present invention can be used as a binder for solidification/stabilization of, for example, a hazardous heavy metal sludge. The dense microstructure results in high durability, low porosity and low permeability, and thus in less leaching. This invention might be particularly well-suited for the stabilization of alkaline radioactive wastes, as the novel cements are expected generally to be more durable than ordinary Portland cements.

In solidifying or stabilizing hazardous wastes in cements generally, air emissions of the hazardous waste can result during the setting of the cement as the hazardous waste is exposed to a liquid, aqueous environment. The rapid set time of the novel cement can help to reduce this problem, because the rapid set time can reduce air emissions resulting from the remediation process itself. Furthermore, the novel cement has a higher fraction of calcium-silicate-hydrate (C—S—H) than does ordinary Portland cement. As the cement forms, C—S—H may react with wastes in the reaction mixture, a feature which may be an advantage in the chemical stabilization of some hazardous wastes. Thus some hazardous wastes may be both solidified and chemically stabilized by incorporation in a novel cement in accordance with the present invention.

Another application of the present invention is use where rapid setting time of a cement or concrete is desired, for example the repair of runways or pavements.

Where rapid setting is not desired, a suitable retarder known in the art may be used to slow the setting time. Examples of such retarders include common sugar and many metal salts.

Another application of the present invention is the placement of concrete in hot climates. Because of its heat of hydration, ordinary Portland cement can buckle or crack when setting in a hot climate. A cement in accordance with the present invention will typically have a low heat of hydration if the alkaline solution is prepared separately (which is preferred in any event), making it more suitable for placement in hot climates. The alkaline solution is preferably allowed to cool to ambient temperature before reacting.

Alternatively, the alkaline solution may be prepared in situ by first mixing the fly ash and alkali together dry, and then adding water in the field, facilitating ease of use where the heat of hydration or the hygroscopic nature of the alkali does not present difficulties. This approach, while not preferred in most circumstances, may have applications where ease of preparation in the field is important. It has the disadvantage that most alkalis are hygroscopic, which can cause the cement to set prematurely unless precautions are taken to promote anhydrous conditions before use.

It is also expected that the high pH environment of a cement in accordance with the present invention will be beneficial when used in steel structures, which are sometimes subject to corrosion in a Portland cement concrete.

The amount of calcium present in the reactants is believed to have importance. The Ca changes the degree of polymerization in the glasses in the fly ash, making it more reactive.

It is expected that greater strengths are obtained at longer curing times. Optionally employing heat to aid the curing process is also expected to result in greater strengths.

The entire disclosures of all references cited in this specification are hereby incorporated by reference.

We claim:

1. A process for making a cement which is denser than ordinary Portland cement, comprising reacting an aqueous solution having a pH of at least 14.69 with a Class C fly ash, wherein:
  (a) the fly ash is present in an amount sufficient to produce a hardened solid following said reacting step;
  (b) the reaction mixture of said reacting step is either free of blast furnace slag and citric acid, or contains blast furnace slag or citric acid in a concentration sufficiently small so as not to substantially weaken the dense microstructure of the cement as compared to the strength of the dense microstructure of an otherwise identically prepared cement containing no blast furnace slag and no citric acid; and
  (c) the resulting cement is either free of ettringite, or contains ettringite in a concentration sufficiently small so as not to substantially weaken the dense microstructure of the cement as compared to the strength of the dense microstructure of an otherwise identical cement containing no ettringite.

2. A process as recited in claim 1, wherein the initial setting time of the cement is less than about five minutes.

3. A process as recited in claim 1, wherein the reaction mixture additionally comprises a retarding agent, whereby the cement sets more slowly than it would set without the retarding agent.

4. A process as recited in claim 1, wherein the reaction mixture additionally comprises a hazardous waste.

5. A process as recited in claim 4, wherein the hazardous waste comprises a radioactive material.

6. A process as recited in claim 4, wherein the hazardous waste comprises an alkaline radioactive material.

7. A process as recited in claim 1, wherein the aqueous solution having a pH of at least 14.69 is prepared and cooled prior to said reacting.

8. A process as recited in claim 7, wherein the aqueous solution is cooled to ambient temperature prior to said reacting.

9. A water-hardenable cement consisting essentially of Class C fly ash and an alkali, which, on mixture with water, has a pH of at least 14.69; wherein the fly ash is present in an amount sufficient to produce a hardened solid following mixture with water; and wherein said water-hardenable cement is either free of blast furnace slag and citric acid, or contains blast furnace slag or citric acid in a concentration sufficiently small so as not to substantially weaken the dense microstructure of a hardened cement resulting from the mixture of said water-hardenable cement with water, as compared to the strength of the dense microstructure of an otherwise identically prepared cement containing no blast furnace slag and no citric acid.

* * * * *